Dec. 25, 1962    N. G. BRAHOS    3,070,088
SURGICAL RETRACTOR DEVICE
Filed Feb. 2, 1961    2 Sheets-Sheet 1

INVENTOR.
Nicholas G. Brahos
BY
HIS ATTORNEYS

Dec. 25, 1962

N. G. BRAHOS 3,070,088

SURGICAL RETRACTOR DEVICE

Filed Feb. 2, 1961

INVENTOR.
Nicholas G. Brahos

BY Green, McCallister & Miller

HIS ATTORNEYS

United States Patent Office 3,070,088
Patented Dec. 25, 1962

3,070,088
SURGICAL RETRACTOR DEVICE
Nicholas George Brahos, Veterans Hospital, Leech Farms Road, Pittsburgh 6, Pa.
Filed Feb. 2, 1961, Ser. No. 86,644
7 Claims. (Cl. 128—20)

This invention relates to surgical apparatus or equipment in the nature of a mechanical retractor device suitable for utilization by surgeons in facilitating an operation and particularly, to a so-called mechanical type of device which may be employed to spread an abdominal or flesh wall of a patient's body, as well as organs, etc. of a cavity or surgical incision and to retain them in a suitable position during surgical procedure.

I have been familiar with the problems presented in connection with the utilization of mechanical retractor devices and have determined that none of those now available are fully satisfactory for operative procedure and particularly, from the standpoint of the surgeon and his assistants. Generally speaking, they are too complex in their construction and utilization, are difficult to manipulate, generally requiring both hands, have clamping means that are difficult and awkward to manipulate and adjust, and especially, where changes in the positioning of parts of the incision are to be made during stages of the operating procedure. None of them have been fully satisfactory from the standpoint of quick, efficient and effective sterilization. In general, they are too complex in their construction and operative utilizations.

It has thus been an object of my invention to fully evaluate the factors and requirements involved in the utilization of a retractor device and to solve the problems heretofore presented by prior art devices;

Another object of my invention has been to devise a new, simplified and more efficient type of mechanical retractor which will meet the difficulties heretofore encountered in the utilization of such a device, and which will eliminate the necessity for so-called hand instruments in more difficult and exacting types of operations;

A further object of my invention is to provide a surgical retractor device of improved construction that can be quickly and effectively sterilized;

A still further object of my invention has been to provide a device whose parts are fully integral or of one-piece construction which can be adjusted to meet various operative conditions and can be manipulated by one hand of an operator, or by the surgeon, himself, to change its adjusted relationship both transversely and longitudinally of its frame part as well as to provide a pivot action where desirable between its retractor parts and its frame part;

These and other objects of my invention will appear to those skilled in the art from the accompanying drawings and the description as well as the claims.

In carrying out my invention, I early discovered that set-screws, camming clamps, ratchets, elongated adjust-slots, blind holes, pin pivots, etc. had to be discarded not only from the standpoint of sanitizing or sterilizing, but also from the standpoint of ease of manipulation. Further, I discovered that it was necessary to avoid sliding cams and sleeves or separately-formed, joined-together portions in either its frame or its retractor parts, and to provide fully and easily accessible openings or slots that do not tend to harbor dirt, etc. and hinder proper cleansing.

Figure 1:
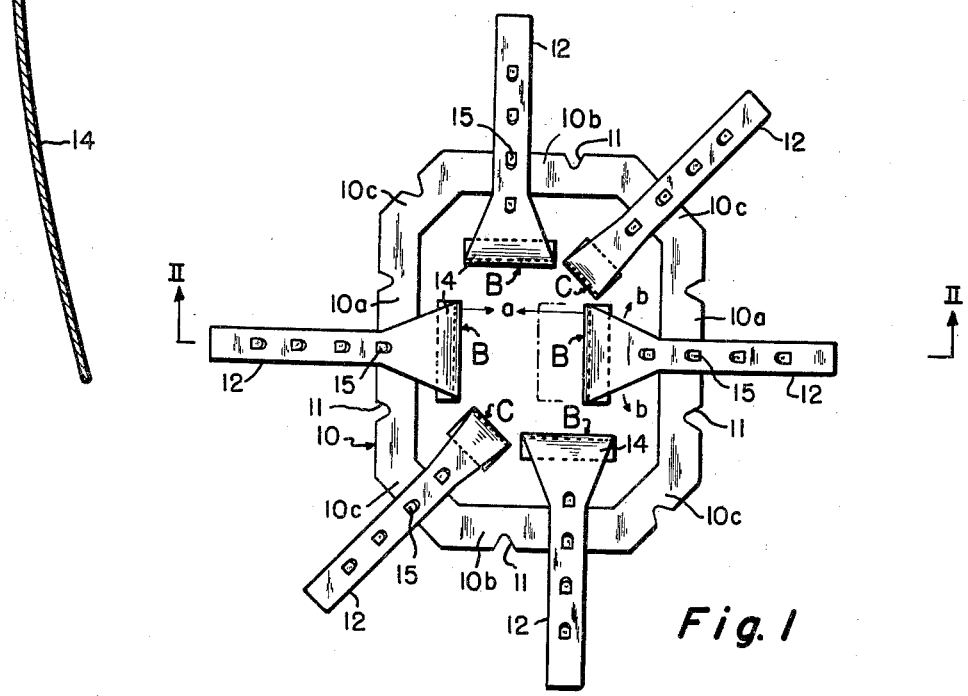
FIGURE 1 is a top plan view showing a device of my invention employing a frame part and a group of retractor parts in operative association therewith and in an arrangement that may be utilized in connection with a body incision.
Figure 2:
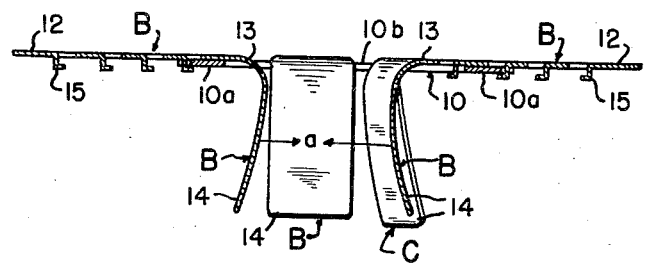
FIGURE 2 is a vertical section in elevation on the scale of and along the line II—II of FIGURE 1.

As shown in FIGURES 1 and 2, I employ an integral frame part 10 which may be of loop, ring or elliptical shape, is of one-piece continuous construction, and is made of flat stock, such that it has substantially planar or flat relatively wide top and bottom faces or sides and relatively narrow inner and outer peripheral edge faces. The inner edge face defines an incision work area about which the frame is used as a substantially circumscribing medium.

Although I have shown a frame 10 of octagonal shape, it will be apparent that other shapes may be used, if desired. This octagonal shape is advantageous from the standpoint that it makes possible the utilization of one to eight retractor parts during operative procedure. Normally, I have determined that about six retractor parts, as shown in FIGURE 1, are all that are required, with a pair of similar retractor parts utilized in opposition to each other on one pair of two alternate pairs of diagonal frame portions, and with pairs of similar retractor parts on oppositely-positioned end and side flange or leg portions of the frame.

Figure 4:
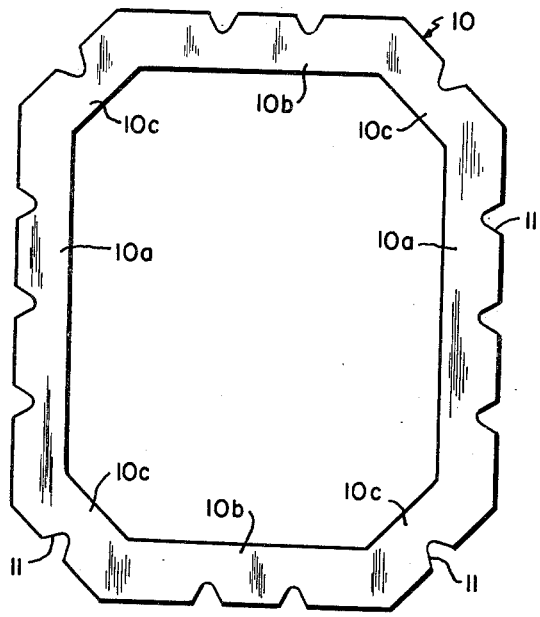
FIGURE 4 is a top plan view of a frame part of my invention.

I prefer to utilize a rust-proof and a sanitary type of material, such a polished stainless steel, in making the parts of my device. The frame part 10, as shown in FIGURE 4, has opposed longitudinal flange sides or legs 10a connected to opposed end flange sides or legs 10b by diagonal or corner flange sides or legs 10c. The outer edge of each of the sides or legs 10a, 10b and 10c is shown provided with at least one latching or positioning slotted portion 11. As shown, the slotted portions 11 have inwardly-declining side edges, rather than straight or complementary edges which enable a radial swing type of action of a hook 15 therein, such as illustrated by the arrows b as to one of the retractor parts B in FIGURE 1. This swinging action is advantageous for meeting difficult operating conditions and gives the device still more flexibility in its utilization.

Figures 5, 6:
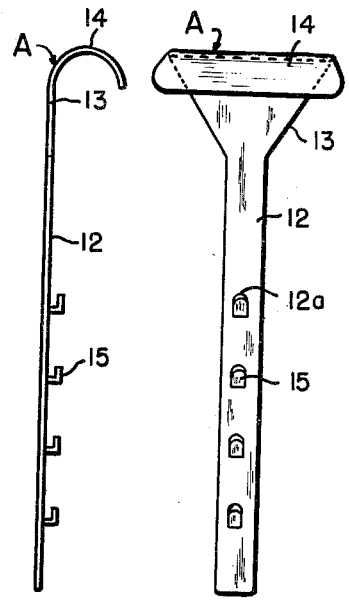
FIGURE 5 is a side edge view and FIGURE 6 is an under side view of a form of retractor part constructed in accordance with my invention.
Figure 7:
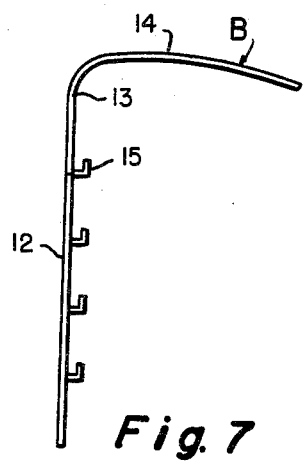
FIGURE 7 is a side edge view and FIGURE 8 is an under side view of another form of retractor part employing the principles of my invention.
Figure 8:
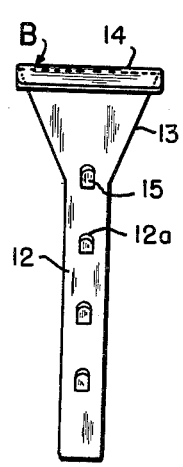
Figures 9, 10:
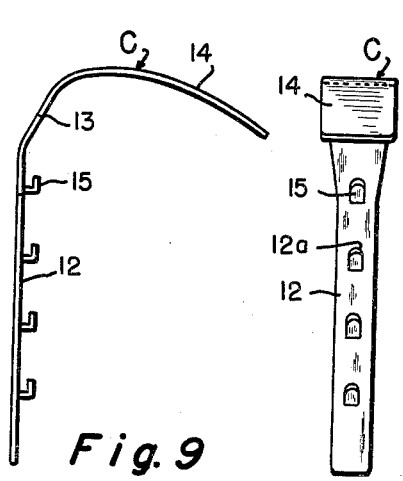
FIGURE 9 is a side edge view and FIGURE 10 is an under side view of a third type of retractor part of my invention.
Figure 11:
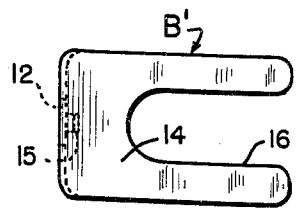
FIGURE 11 is a front view in elevation of a modified form of the retractor part of FIGURES 7 and 8. It will be noted that FIGURES 4 to 11, inclusive, are on the same scale which is intermediate between the scales, of FIGURES 1 and 3.

By way of illustration, I have shown various types of retractor devices A, B, C, and B' which I have found to be useful and practical in connection with employment of my invention and for different types of operations. For example, the type of retractor part A shown in FIGURES 5 and 6 may be used for a relatively shallow type of incision, and the types of FIGURES 7 to 11 for a relatively deeper type. The type C has somewhat narrow shoulder and blade portions (see FIGURES 9 and 10) and may be advantageously used at ends or corners of an incision, while the type B has wider shoulder and blade portions (see FIGURES 7 and 8) and may be used at sides or ends of an incision. The type B' of FIGURE 11 has a bifurcated blade 14 provided with integral legs 16 and is particularly suitable for gall bladder operations.

As shown particularly in FIGURES 5 to 11, inclusive, each retractor part A, B, C and B' is of substantially flat material having a longitudinally-extending arm or leg portion 12 with substantially planar opposed, top and bottom, wide side faces and is adapted to be placed on a wide face of the frame part 10 to extend transversely-inwardly thereof. The arm portion 12 is connected through an integral shoulder or bend portion 13 to a vertically-projecting foot, tongue or blade portion 14. The portion 14 is constructed to engage an abdominal, flesh wall or organ of the patient's body within an incision or cavity and to, in effect, hold it in a desired relationship during the operating procedure.

The arm portion 12 is, as shown, provided with a group or series of longitudinally spaced-apart latching tab portions or hooks 15 that project from its under side or face and define cooperating pairs of forwardly-open, somewhat angular-shaped latching portions. The hooks 15 may be formed by punching, stamping or cutting them out from the arm portion 12 whereby slots or cleaning access openings 12a are formed in arm 12 and extend transversely therethrough. In this connection (see particularly FIGURES 6, 8 and 10), the hook portions 15 are integrally connected at their back ends to the access openings or open slots 12a in the arm portion 12 and project outwardly or downwardly, substantially perpendicular to and backwardly, substantially parallel to the under or bottom face of such arm portion 12.

Figure 3:
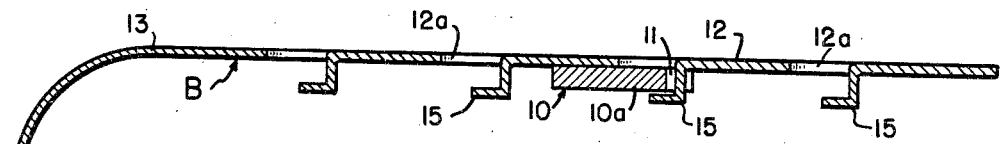
FIGURE 3 is an enlarged sectional view in elevation through a retractor part of my device illustrating it in latching engagement with a frame part.

As shown particularly in FIGURES 1, 2 and 3, the spacing between the hooks 15 (adjacent pairs) is greater than the width of the frame part 10. That is, the spacing between the back portion of one hook 15 and the forward end of an adjacent, backwardly-positioned hook 15 is slightly greater than the distance between the inner and outer edges of the flange of the frame part 10, in order that the retractor part can be readily inserted or laid transversely upon the frame part between any desired pair of hooks 15.

The force or pull exerted by the flesh or organ of the incision is represented by the arrows a of FIGURE 2. Such somewhat resilient tension force action, as applied to the blade portion 14, will draw the retractor part inwardly in a transversely-inwardly sliding relation on the face of the frame part 10 to cause an adjacent back hook 15 to engage within a cooperating and aligned slotted portion 11 (see particularly FIGURES 1 and 2), to thus hold the retractor part in a latched relationship with respect to the frame part 10. At such time, as shown particularly in FIGURE 1, the operator may pivot or swing a particular retractor part in its latched-on relation in a radial manner, as indicated by the arrows b of FIGURE 1, see the right-hand retractor part B of such figure. As previously pointed out, this swinging action of a retractor part in its latched position is facilitated or made practical by the somewhat inwardly-sloped or declining shape of the latching slotted portion 11. That is, as shown, the slotted portion 11 is of sufficient width to permit an adjacent hook 15 to substantially enter therein, but being of a somewhat wedge-shaped inwardly or towards its closed inner valley, provides a somewhat pivot type of mounting.

It will also be seen from FIGURES 1 and 3 that each of the retractor parts, when in a mounted position on the frame part 10, may be moved or slid on the planar or flat top flange-like face of the latter, along the full continuous length thereof. For example, the retractor parts B may be selectively slid between aligned positions with respect to the three slotted portions 11 in each of its side legs 10a or, if desired, into alignment with a slotted portion in a diagonal leg 10c or an end leg 10b. The retractor parts B at the end legs 10b of the frame 10 may be also similarly selectively adjusted between a pair of slotted portions 11 thereon or moved to any positioned along the frame, and the diagonally-positioned retractors C may also be moved to any desired position along the frame. This shows the extreme flexibility of utilization of my device.

In addition, any one of the retractor parts can be easily removed with one hand by first pulling it on the frame 10 transversely-outwardly of the opening or incision in the patient's body, so as to disengage a hook 15 from its cooperating latching slotted portion 11, and then by lifting it off the frame 10. The tension force exerted by the flesh of the incision automatically retains the retractor parts in their latching engagement on the frame part 10 during the operation. By lifting off one unlatched retractor part, it can then be placed across the frame 10 between another selected pair of hooks 15 to thus provide it with a different transverse mounting, as may be needed, either during the operative procedure or at the beginning thereof, as desired.

What I claim is:

1. In a surgical retractor device having a ring frame with an inner edge thereof defining an open central work area, longitudinally spaced-apart slotted latching portions extending inwardly from an outer edge of said frame, at least one retractor part having a downwardly-projecting blade portion constructed to extend within the work area and to engage the flesh wall of a body incision, said retractor part having an arm portion extending backwardly from said blade portion and constructed to rest upon said frame and extend transversely thereof, said arm portion having a group of vertically-forwardly-projecting hooks spaced longitudinally therealong to selectively cooperate with and engage one of said slotted portions and adjust the transverse positioning of said retractor part, the spacing between said hooks being greater than the width of said frame, so that said retractor part may be moved transversely-backwardly with respect to said frame to disengage one of said hooks from a cooperating aligned slotted portion for sidewise movement of said retractor part along said frame into a cooperating aligned position with another slotted portion, and said retractor part being movable on and off said frame part when said one hook is disengaged from said cooperating slotted portion, at least one of said slotted portions having inwardly-declining side edges to engage with a cooperating hook of said retractor part and define a swing axis with respect thereto, whereby said retractor part may be swung about said frame with said one slotted portion as an axis.

2. In a surgical retractor device as defined in claim 1 wherein, said arm portion has a group of slots therealong open through its opposed top and bottom faces, and said group of hooks project downwardly and forwardly from the bottom face of said arm portion at a back edge portion of said slots.

3. In a surgical retractor device having a ring frame with an inner peripheral edge thereof defining an open central work area, said ring frame being of one-piece continuous construction having relatively narrow edge faces, slotted latching portions having inwardly-declining side edges that extend inwardly from an outer peripheral edge of said frame and are positioned in a spaced relation with respect to each other along said frame, at least a pair of retractor parts each having a downwardly-projecting forward blade portion constructed to extend within the work area and engage the wall of a body incision, each of said retractor parts having a shoulder portion extending backwardly from said blade portion and an arm portion connected to said shoulder portion and extending backwardly therefrom to rest upon said frame and extend transversely thereof, said arm portion having a group of vertically-downwardly and forwardly-projecting hooks spaced longitudinally therealong in a spaced relationship greater than the distance between the inner and outer edges of said frame to selectively cooperate with and rotatably-engage different ones of said slotted portions for adjusting the transverse positioning of said retractor part with respect to said frame part, and said retractor parts being positioned on opposed portions of said frame to project towards each other and hold the wall of the body incision in an open relationship.

4. In a surgical retractor device as defined in claim 3 wherein, the arm portion of each of said retractor parts has longitudinally spaced-apart slots open through its top and bottom faces, and said hooks project from base edge portions of said slots integrally from said arm portion.

5. In a surgical retractor device having a ring frame with an inner edge thereof defining an open central work area, peripherally spaced-apart slotted latching portions extending inwardly from an outer edge of said frame, at least one retractor part having a downwardly-projecting blade portion constructed to extend within the work area and to engage the flesh wall of a body incision, said retractor part having an arm portion extending backwardly from said blade portion and constructed to rest upon said frame and extend transversely thereof, said arm portion having at least one forwardly-projecting hook for selectively-cooperatively-engaging different ones of said slotted latching portions, said hook being forwardly-unobstructed, so that said retractor part may be moved transversely-backwardly with respect to said frame to disengage said hook from a cooperating-aligned slotted latching portion for sidewise movement of said retractor part along said frame into a cooperating aligned position with another slotted latching portion, said retractor part being movable on and off said frame part when said hook is disengaged from a cooperating-aligned slotted latching portion, and at least one of said slotted latching portions having inwardly-declining side edges to engage with the hook of said retractor part and define a swing axis with respect thereto, whereby said retractor part may be swung about said frame with said one slotted portion as an axis.

6. In a surgical retractor device having a ring frame with an inner peripheral edge thereof defining an open central work area, said ring frame including slotted latching portions that have inwardly-declining side edges that extend inwardly from an outer peripheral edge of said frame, said slotted latching portions being positioned in a spaced relation with respect to each other along said frame, at least a pair of retractor parts, each having a downwardly-projecting forward blade portion constructed to extend within the work area and engage the wall of a body incision, each of said retractor parts having a shoulder portion that extends backwardly from said blade portion and an arm portion that is connected to said shoulder portion and extends backwardly therefrom to rest upon said frame and extend transversely thereof, said arm portion having at least one vertically-downwardly and forwardly-projecting hook to selectively cooperate with and engage different ones of said slotted portions, and said retractor parts being positioned on opposed portions of said ring frame to project towards each other and hold the wall of the body incision in an open relationship.

7. In a surgical retractor device as defined in claim 6 wherein, said frame has a pair of opposed side legs, a pair of opposite end legs and pairs of opposed diagonal legs connecting said side and end legs together in the form of an integral structure, and said slotted portions are positioned along said side legs, said end legs, and said diagonal legs.

References Cited in the file of this patent
UNITED STATES PATENTS

| 2,013,892 | Lucas | Sept. 10, 1955 |
| 2,863,444 | Winsten | Dec. 9, 1958 |

FOREIGN PATENTS

| 70,332 | Austria | May 1, 1915 |

OTHER REFERENCES

The Kny-Scheerer Corporation catalogue of "Surgical Instruments," Fig. E/6642 of page 5174, 1921. (Copy in Div. 55.)

The Mueller & Co. Catalogue, "Hospital Instruments Equipment Supplies," 1938, Fig. GO-790 of page 371. (Copy in Div. 55.)